United States Patent Office 2,905,541
Patented Sept. 22, 1959

2,905,541

STABLE DISTILLATE FUEL OIL COMPOSITIONS

Ralph I. Gottshall, Willow Grove, and Mark L. Hill, Jr., Springfield, Pa., assignors to Gulf Oil Corporation, Pittsburgh, Pa., a corporation of Pennsylvania No Drawing. Application July 31, 1953
Serial No. 371,794

5 Claims. (Cl. 44—72)

This invention relates to stable distillate fuel oil compositions and particularly to compositions of this type having good water separation properties, and other desirable characteristics.

Sludge deposition in distillate fuel oils, e.g., of the type utilized in domestic fuel burners and diesel engines, is undesirable, since such deposition may lead to clogging of fuel filters or screens, and/or plugging of burner nozzles or fuel injection ports. Different specific fuel oil distillates vary as to their sludge depositing characteristics, principally with respect to the kinds of processing treatment to which the distillates have been subjected. Thus, straight run fuel oil distillates containing naphthenic acids not completely removed by caustic washing or traces of "doctor" solution may exhibit appreciable sludging tendencies. On the other hand, catalytically cracked fuel oil distillates may or may not per se exhibit severe sludging tendencies. In any event, extensive color darkening of such distillates during storage is evidence of instability. The instability of cracked fuel oil distillates is generally attributable to the fact that such distillates contain relatively high proportions of olefinic and aromatic constituents, which constituents are relatively more susceptible to chemical reaction. Curiously, mixtures of straight run and catalytically cracked fuel oil distillate (blended to produce a fuel oil having better burning characteristics than cracked distillate alone, and also to balance refinery production) normally display substantially poorer sludging characteristics than either component oil of the mixture.

To overcome the above-described tendency toward sludge deposition in distillate fuel oils, it is desirable to employ dispersant type additives which function primarily to prevent residue formed from merging to form particles large enough to constitute troublesome sludge deposits. Such dispersant type additives may or may not actually reduce the total amount of residue formed in the fuel oil.

The present invention relates to novel distillate fuel oil compositions containing certain subsequently described additive compositions in amounts sufficient to inhibit sludge deposition. The fuel oil compositions of this invention are especially advantageous in that the additive compositions utilized to enhance stability to sludging leave no ash on combustion. Moreover, these additive compositions do not impart undesirable water separation properties to the fuel oil, i.e., they do not promote formation with the fuel oil of stable suspensions or emulsions of high water content. Poor water separation properties, or high water tolerances, are undesirable in distillate fuel oils, since entrained water may act to accelerate or increase sludge deposition. Moreover, water entrained in fuel oil is subject to freezing under cold weather conditions, whereby the resultant ice particles may cause clogging or plugging of filters, screens or the like, through which the fuel is caused to flow.

More specifically, the invention is concerned with stabilized distillate fuel oils, i.e., fuel oils of the No. 2 grade boiling within the range of 350° to 750° F. and having a minimum API gravity of 26°, which stabilized fuel oils have incorporated therein in an amount sufficient to inhibit sludge deposition an additive composition comprising (a) an amine salt of an aliphatic amine containing from 4 to 30 carbon atoms per substituent and a dialkyl orthophosphoric acid whose alkyl substituents contain from 3 to 18 carbon atoms, and (b) an aliphatic amine of the same class as that combined in the amine salt. The weight ratio of amine to amine salt may be from about 1:2 to about 2:1. The invention is valuable in connection with mixtures of straight run and catalytically cracked fuel oil distillate, and especially those mixtures within the composition range of about 4:1 and about 1:4 straight run to cracked distillate, because of the unusual severity of the sludging problem for such mixed fuel oils.

As indicated, the additive compositions herein described are employed in an amount sufficient to inhibit sludge deposition in the fuel oil. It is generally desirable from an economic standpoint to employ a concentration no greater than that adequate to produce the desired degree of improvement. The concentration necessary to produce the desired degree of improvement will, of course, vary somewhat for different specific fuel oils. Normally, from about 0.002 to about 0.1 percent by weight of the fuel oil composition of the combined additives is sufficient to accomplish major improvement in the sludging characteristics of the fuel oil. However, in some instances it may be desirable to employ the additive compositions in concentrations of up to about 0.5 percent by weight of the fuel oil composition. Although some improvement in sludging characteristics may be obtained with less than the minimum proportion indicated, amounts within the above-mentioned range of proportions are normally desirable, in order to obtain major improvement.

In order that each component of the disclosed additive combination may exert its desired influence in the composition, it is essential that each of the components be present in certain proportions with respect to the other. Additive compositions wherein the amine to amine salt weight ratio is between about 1:2 and 2:1 conform to these requirements and produce excellent results with respect to reduction in sludge deposition. Appreciable deviation from these proportions should be avoided in order to prevent reduction of this and other advantages. Additive compositions wherein the amine and amine salt are present in a weight ratio of about 1:1 are preferred. Admixture of the preferred additive compositions with fuel oils in the range of concentrations indicated results in fuel oil compositions containing from 0.001 to 0.25 percent by weight of amine and from 0.001 to 0.25 percent by weight of amine salt. As indicated, the balance of amine:amine salt proportions between the weight ratios of about 1:2 and about 2:1 should in no case be departed from appreciably.

The dialkyl o-phosphoric acid-amine salts included in the additive composition referred to above are simple addition salts of the class indicated. Amines capable of forming the addition salts included in this invention are primary, secondary and tertiary aliphatic amines having from 4 to 30 carbon atoms per substituent. The aliphatic substituents of these amines may themselves contain unsaturated linkages or substituents which do not adversely affect the dispersant properties of the amine salt and which do not interfere materially with its oil-solubility. The aliphatic amine substituents may be open chain or cyclic. Particularly desirable results are achieved with primary alkyl amines having from 8 to 18 carbon atoms. Especially outstanding results, not only from the standpoint of the characteristics noted above, but also from the standpoint of ease of handling and blending with fuel oil, have been achieved by the use of amine salts of primary amines containing tertiary alkyl substituents containing from 12 to 15 carbon atoms, since such amines result in amine salts having relatively low pour-points and viscosities. Especially suitable for the compositions of this invention are those commercial mixtures of amines such as "cocoamine," a mixture of primary amines derived in conventional fashion from cocoanut oil fatty acids. The most predominant component of this mixture is lauryl amine, but in addition lesser amounts of octyl, decyl, tetradecyl, hexadecyl, octadecyl and octadecenyl amines are contained therein. Cocoamine has an average molecular weight of about 200–210. Also highly suitable for the purposes of this invention is the commercial product Primene 81–T, manufactured by Rohm & Haas of Philadelphia, Pa. This product is described by the manufacturer as a mixture of primary amines corresponding to the generic formula $$t\text{-}C_{12\text{-}15}H_{25\text{-}31}NH_2$$

having a molecular weight of from 185 to 227. Amines of the foregoing class are readily reactable with dialkyl o-phosphoric acids, whose alkyl substituents are either straight chain or branched chain and which contain from 3 to 18 carbon atoms, to form the amine salts of this invention. The 3-methylbutyl,2-ethylhexyl o-phosphoric acid is a preferred acid. Specific examples of amine salts embraced by the invention are the octyl, lauryl, tridecyl, myristyl, pentadecyl, octadecyl, octadecenyl, cyclohexyl, and dicyclohexyl amine salts of the di-n-propyl, di-n-butyl, di-capryl and the isoamyl octyl or 3-methylbutyl,-2-ethylhexyl o-phosphoric acids.

The remaining component of the composition, free amine, is, as indicated, of the same class as the amines combined in the amine salt. Thus, the free amine is also a primary, secondary, or tertiary aliphatic amine having from 4 to 30 carbon atoms per substituent. As in the case of the amine salts, primary amines having from 8 to 18 carbon atoms are preferred, and especially branched chain primary amines having from 12 to 15 carbon atoms. Most conveniently, the free amine or mixture thereof is identical with that combined with the o-phosphoric acid.

The preparation of the amine salts included herein is entirely conventional and forms no part of the present invention. The selected amine salt may be separately prepared and then admixed with the desired free amine in the proportions denoted above to form the additive combination. Alternatively, to the selected dialkyl o-phosphoric acid may be added the selected amine or mixture of amines in an amount not only sufficient to react with the acid but also sufficient to provide an excess of from 50 percent to 200 percent by weight of the amine salt reaction product.

Each of the agents which are used to form the additive combinations of this invention are, of course, miscible with fuel oils in the indicated proportions. Accordingly, the respective agents may be added to the fuel oil separately and in any order, or in admixture with one another. Also, one or both components of the additive mixture may be added to the fuel oil in the form of a concentrated solution in a suitable mineral oil solvent. This last procedure is that preferred.

An advantageous additive composition, hereinafter referred to as Composition A, of the foregoing kind was prepared by admixing approximately 281 parts by weight of 3-methylbutyl,2-ethylhexyl o-phosphoric acid with approximately 217 parts by weight of Primene 81–T ($t\text{-}C_{12\text{-}15}H_{25\text{-}31}NH_2$), having a neutralization equivalent of 217. In addition, about 498 parts by weight of excess Primene 81–T were added. The reaction proceeded spontaneously with the evolution of heat. The temperature was maintained below 180° F., and was permitted to continue to completion. The product obtained was a straw-colored, clear, nonviscous liquid having a pH (measured with a calomel electrode) of 8.8. The amine:amine salt ratio of this composition was substantially 1:1.

A second additive composition of the type disclosed, hereinafter referred to as Composition B, was prepared in a manner similar to that indicated above by admixture of about 281 parts by weight of 3-methylbutyl,2-ethylhexyl o-phosphoric acid and approximately 486 parts by weight of cocoamine. The amine to amine salt ratio of this composition corresponded approximately to 1:2. The reaction in this case was effected in the presence of a mineral lubricating oil solvent so as to result in a concentrate containing 20 percent active ingredients. The product had a pH within the range 9.3–9.5.

The additive compositions described above demonstrated numerous desirable properties in admixture with distillate fuel oils as indicated by the tests described below.

EXAMPLE I

Compositions A and B were respectively admixed in small amounts with separate samples of a typical No. 2 fuel oil stock containing 28 percent caustic washed fluid catalytically cracked fuel oil distillate and 72 percent straight run fuel oil distillate of which 32.8 percent was straight run distillate obtained from Kuwait-Mara crude and of which 39.2 percent was straight run distillate obtained from Eastern Venezuelan crude. Each of the resulting samples was tested for stability to sludging. This test was carried out as follows:

A 600 gram sample of fuel oil was heated for 40 hours at 210° F. in a loosely stoppered clear glass bottle. Following the heating period, the sample was cooled to room temperature and filtered by suction through a tared, medium porosity, fritted glass, Gooch-type crucible. The sludge in the crucible was washed with heptane. Complete removal of the sludge adhering to the inside of the bottle was accomplished by means of a rubber policeman and heptane. The crucible was dried in an oven at 210° F. for one hour, cooled in a desiccator and reweighed. The increase in weight was recorded as mg. sludge per 600 grams of oil.

In addition, the respective samples indicated above were tested for rust preventive properties by subjecting the oil samples to ASTM Test D665–52T, Procedure A. This test is well known to those skilled in the art and need not be described in detail. Very briefly, the test involves immersion of a steel rod in an oil and distilled water mixture at a specified temperature for a specified period of time, following which the steel rod is examined for rust. The beneficial properties of the distillate fuel oil compositions containing additive Composition A and additive Composition B with respect to stability to sludging and rust prevention are shown by the results tabulated below:

Table A

| Additive, Percent by Wt.: | | | |
|---|---|---|---|
| Composition A | | | 0.01 |
| Composition B (20% Sol. in Min. Oil) | | 0.03 | |
| Stability Test: 40 Hr., 210° F. | | | |
| Insol. Sediment, mg./600 g | 42.1 | 16.1 | 5.3 |
| Filtrate: Color, ASTM Union | 3.75 | 3.75 | 3.75 |
| Inspection: Rust Preventive Test, ASTM D 665-50 T, Procedure A—Steel Rod, Appearance | 10% Rust | bright-passes | br.-passes |

EXAMPLE II

In order to illustrate the ultraviolet light stability of fuel oils containing Composition A, samples of the same No. 2 fuel oil described in Example I containing a small amount of Composition A were subjected to Gulf U–V Light Stability Test, Method 332, and also the Gulf Research & Development Company U–V Light Stability Test. According to the Gulf Test, a 100 ml. oil sample is poured into a quartz test tube 1¼ inches in diameter and 8 inches in length. The quartz tube containing the oil sample is then placed in a water-jacketed receptacle in a standard Type C–3B Eveready Carbon Arc Solarium unit. After the sample is exposed to carbon arc light for the desired period of time, the contents of the tube are inspected and may be subjected to any further desired tests. In general, 20 minutes' exposure to the carbon arc light under the conditions of this test is equivalent to approximately one hour exposure in a similar container to direct June sunlight at latitude 42. The results of the test are reported below as number of hours' exposure of the sample and the hours of exposure to the carbon arc light required to form a precipitate. The ASTM Union color of the sample was also recorded.

The Gulf Research & Development Company U–V Light Stability Test is carried out by exposing a 100 ml. sample of the oil to be tested to a light source rich in ultraviolet rays for a period of 4 hours alternated with periods of 20 hours during which the oil was stored in the dark. The test is complete after 40 hours' exposure to the light. At the end of each dark storage period, the sample is examined for the presence of precipitated sediment or sludge. Exposure to light is accomplished by placing samples of fuel oil in 4 oz. unstoppered glass bottles to allow free access of air. These bottles are placed in a circular metal enclosure at a distance of 22 inches from the light source (a Westinghouse 400 watt Type 2–8–1 mercury vapor lamp mounted vertically in the center of the housing). A temperature rise of about 20° F. is found to occur during the exposure period. The interval of dark storage is permitted to allow any dispersed sludge to settle and to permit oxygen to replace any used in the light induced reaction. The effect of the exposure to light was judged by swirling the bottle and estimating the quantity of precipitate which had settled. The results are recorded in terms of the number of hours of exposure to light required to produce a trace of sludge and light, medium and heavy sludge.

The improvement in light stability of the fuel oil composition produced by Composition A is illustrated by the data recorded below:

Table B

| | | |
|---|---|---|
| Composition A, Percent by Wt. | | 0.01 |
| U–V Light Stability Test, Gulf 332, Quartz Tube 8 Hrs.: | | |
| Color, ASTM Union | 6.0 | 5.0 |
| Hrs. to Ppt. | 3 | 7 |
| U–V Light Stability Test, (GR & DC): | | |
| Time to Sludge Formation, Hrs.— | | |
| Trace | 4 | 12 |
| Light | 12 | 40 |
| Medium | 28 | |
| Heavy | 36 | |
| Sludge at end of 40 Hrs. | heavy | light |

EXAMPLE III

The color stabilizing properties of Composition A were illustrated by subjecting a sample of a 60–40 by volume blend of straight run and cracked No. 2 distillate containing 0.01 percent by weight of Composition A to a color stability test under conditions simulating normal bulk storage. Briefly, this test involved dark storage of the sample for 20 hours at 100° F. and for 4 additional hours at room temperature. Each such 24-hour period is denoted as a cycle. The condition of the oil was observed at the end of ten such cycles. The color stabilizing effects of Composition A are illustrated by the data presented below:

Table C

| Test | No Additive | 0.01% By Wt., Composition A |
|---|---|---|
| Color, ASTM Union: | | |
| Before Test | 2.0 | 2.0 |
| After 10 Cycles | 6.0 | 3.5 |

EXAMPLE IV

In order to demonstrate the desirable water separation properties of distillate fuel oils containing the disclosed additive compositions, fuel oil samples containing various concentrations of Composition A were tested for water tolerance according to U.S. Government Test Fed. 325.1.3, described in "Federal Specifications VV–L–791D," amended June 20, 1950. Briefly, this test involves vigorous agitation of 80 ml. of oil with 20 ml. of water at room temperature for from 2 to 3 minutes, following which the mixture is allowed to settle for 5 minutes. The results were recorded in terms of the volume of water, the volume of emulsion, the volume of oil and also the time required for the oil layer to become clear. In order to afford some basis for comparison of the desirable water separation properties of the disclosed additive compositions, additional fuel oil samples containing comparative concentrations of a sulfonate dispersant-type additive were tested in a similar fashion. The results of this test are indicated in the following table:

Table D

[Stock—50/50 blend Eastern Venezuela straight run and fluid catalytically cracked No. 2 fuel oil distillate.]

| Run No. | 1 | 2 | 3 | 4 | 5 |
|---|---|---|---|---|---|
| Additive, percent by Wt. Barium Salt of Wax, Alkyl Benzene Sulfonic Acid (50% by Wt. Concentrate) | | | | 0.01 | 0.02 |
| Composition A (91% by Wt. Conc.) | | 0.01 | 0.022 | | |
| Water Tolerance, Fed. 325.1.3: | | | | | |
| 5 Min. Reading, ml.— | | | | | |
| Water | 20.0 | 19.0 | 18.0 | 12.0 | 6.0 |
| Emulsion | 0.0 | 0.0 | 0.0 | 8.0 | 11.0 |
| Oil | 80.0 | 81.0 | 82.0 | 80.0 | 83.0 |
| Time for Oil Layer to Become Clear, Hrs. | 7.0 | 24+ | 12.0 | 24+ | 24+ |
| Recovery of Oil, percent | 99+ | 99+ | 99+ | 99+ | 99+ |

The ability of the subject additive compositions selectively to inhibit sludge deposition without at the same time exerting a strong tendency to disperse substantial proportions of water in the oil constituents is a distinct advantage for the reasons indicated above.

EXAMPLE V

To illustrate the improved sludge inhibiting characteristics resulting from the use of the specified proportions of free amine in the additive composition, separate samples of a fifty-fifty blend of Eastern Venezuelan straight run and catalytically cracked No. 2 fuel oil distillates containing respectively small amounts of the substantially neutral (pH 6.5–7.5) addition salts of cocoamine and 3-methylbutyl,2-ethylhexyl o-phosphoric acid and Composition A were tested according to Gulf Method 562 described above. The substantially neutral salts referred to above contained admixed therewith an excess of amine beyond the stoichiometric quantity required to react with the phosphoric acid, the excess being of the order of about 4 to 5 percent of the weight of the amine salt. The results of these tests are indicated below:

*Table E*

[Stock—50/50 blend Eastern Venezuela S.R. and F.C.O. No. 2 fuel oil distillate.]

| Additive, percent by Wt.: | | | | |
|---|---|---|---|---|
| Composition A | | 0.01 | 0.022 | |
| Neutral Salt of Cocoamine and 3-methylbutyl, 2-ethylhexyl o-phosphoric acid Plus 4–5 % Cocoamine (84% sol.) | | | | 0.04 |
| Stability Test, Gulf 562: 40 Hrs., 210° F., mg. Sludge/600 g | 14.0 | 1.4 | 1.0 | 5.9 |

It is noted that Composition A produced 32 percent to 35 percent less sludge than did the substantially neutral amine salt, despite the fact that Composition A was used in lesser concentrations.

The foregoing examples illustrate many of the highly desirable properties of fuel oils containing additive compositions of the disclosed type. Thus, sludge deposition is reduced in distillate fuel oils by incorporation therein of small proportions of the herein described additive compositions. Moreover, distillate fuel oils containing these additive compositions show no increase in ash on combustion due to the presence of the additive composition, possess rust preventive properties, and demonstrate excellent water separation characteristics, i.e., low water tolerance. As also indicated, the herein disclosed additive compositions impart increased color and light stability to the fuel oils. It is understood, of course, that other of the disclosed additive compositions may be substituted for those described in the foregoing examples.

If desired, the stable fuel oil compositions of this invention may contain (in addition to the additive compositions previously discussed) oxidation inhibitors, flash point control agents, defoaming agents, ignition quality improvers, combustion improvers and other additives adapted to improve the oils in one or more respects.

It will be apparent to those skilled in the art that many variations and modifications of the above-described invention may be practiced without departing from the spirit thereof. Accordingly, only such limitations should be imposed on the scope of the invention as are indicated in the claims appended hereto.

We claim:

1. A stable fuel oil composition comprising a major amount of a mixture of straight run and catalytically cracked distillate fuel oil tending to deposit sludge and a minor amount, sufficient to inhibit sludge deposition, of a combination of (I) an amine salt of (*a*) an aliphatic amine whose N-substituents are selected from the group consisting of hydrogen and hydrocarbon radicals containing from 4 to 30 carbon atoms each and, (*b*) a dialkyl orthophosphoric acid whose alkyl substituents contain from 3 to 18 carbon atoms, and (II) an amine of the same class as that combined in the amine salt, the weight ratio of amine to amine salt being from about 1:2 to about 2:1.

2. A stable fuel oil composition comprising a major amount of a mixture of straight run and catalytically cracked distillate fuel oil tending to deposit sludge and from about 0.002 to about 0.5 percent by weight of the composition of a combination of an amine salt of a primary alkyl amine whose alkyl substituent contains from 8 to 18 carbon atoms and a dialkyl orthophosphoric acid whose alkyl substituents contain from 3 to 18 carbon atoms, and an amine of the same class as that combined in the amine salt, the weight ratio of amine to amine salt being from about 1:2 to about 2:1.

3. A stable fuel oil composition comprising a major amount of a mixture of straight run and catalytically cracked distillate fuel oil tending to deposit sludge and from about 0.002 to about 0.5 percent by weight of the composition of a combination of an amine salt of a primary alkyl amine whose alkyl substituent contains from 8 to 18 carbon atoms and a dialkyl orthophosphoric acid whose alkyl substituents contain from 3 to 18 carbon atoms, and an amine of the same class as that combined in the amine salt, the weight ratio of amine to amine salt being approximately 1:1.

4. A stable fuel oil composition comprising a major amount of a mixture of straight run and catalytically cracked distillate fuel oil tending to deposit sludge and from 0.002 to about 0.5 percent by weight of the composition of a combination of an amine salt of a primary, branched chain, alkyl amine whose alkyl substituent contains from about 12 to 15 carbon atoms and 3-methylbutyl,2-ethylhexyl orthophosphoric acid, and an amine of the same class as that combined in the amine salt, the weight ratio of amine to amine salt being from about 1:2 to about 2:1.

5. A stable fuel oil composition comprising a major amount of a mixture of straight run and catalytically cracked distillate fuel oil tending to deposit sludge and from about 0.001 to about 0.25 percent by weight of the composition of the amine salts of mixed primary, branched chain, alkyl amines whose alkyl substituents contain from 12 to 15 carbon atoms and 3-methylbutyl, 2-ethylhexyl orthophosphoric acid and approximately an equal amount of mixed primary, branched chain, alkyl amines whose alkyl substituents contain from 12 to 15 carbon atoms.

References Cited in the file of this patent

UNITED STATES PATENTS

| 2,297,114 | Thompson | Sept. 29, 1942 |
| 2,550,982 | Eberz | May 1, 1951 |
| 2,607,665 | Duncan | Aug. 19, 1952 |
| 2,672,408 | Bonner | Mar. 16, 1954 |
| 2,728,643 | Vaughn | Dec. 27, 1955 |
| 2,728,728 | Vaughn | Dec. 27, 1955 |